A. R. HUSSEY.
APPARATUS FOR COLLECTING DRINKING CUPS.
APPLICATION FILED MAY 12, 1910.

986,571.

Patented Mar. 14, 1911.

3 SHEETS—SHEET 1.

A. R. HUSSEY.
APPARATUS FOR COLLECTING DRINKING CUPS.
APPLICATION FILED MAY 12, 1910.
986,571.
Patented Mar. 14, 1911.
3 SHEETS—SHEET 2.
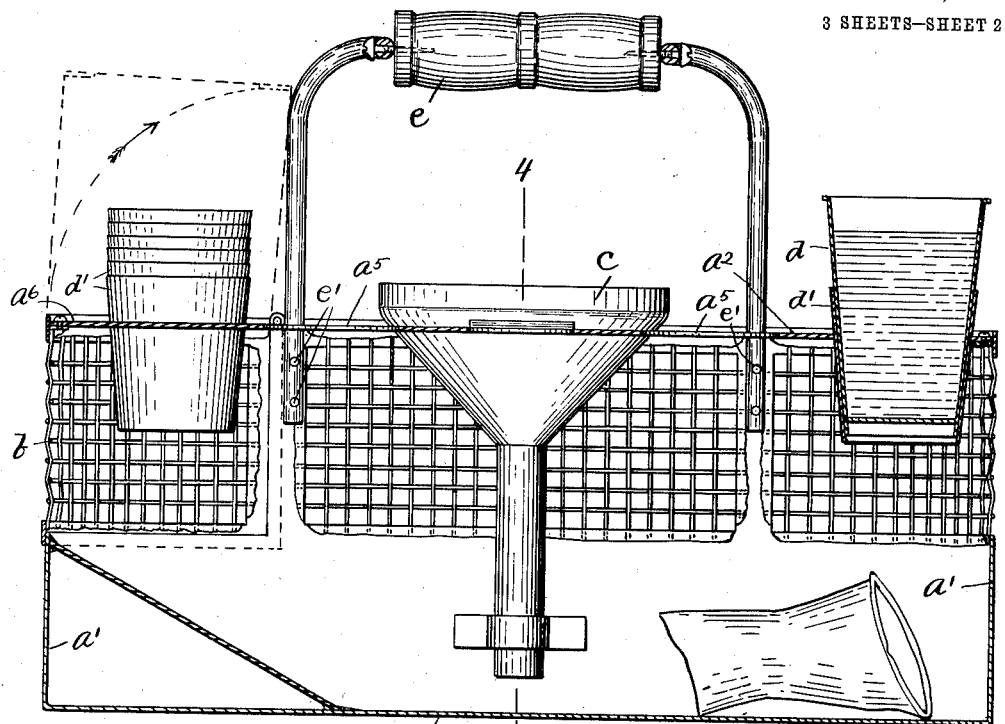
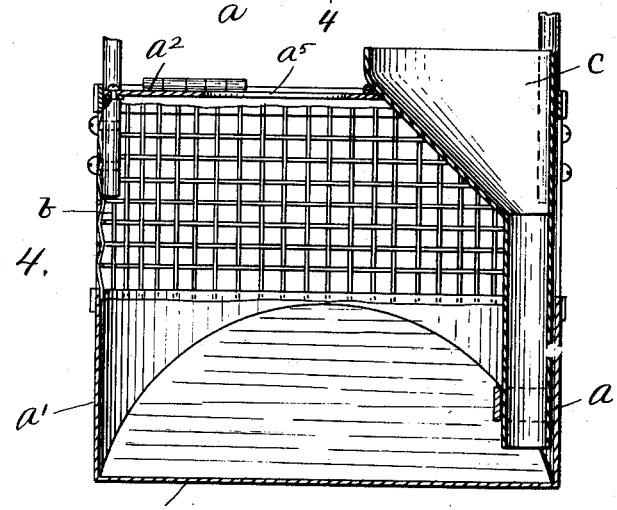
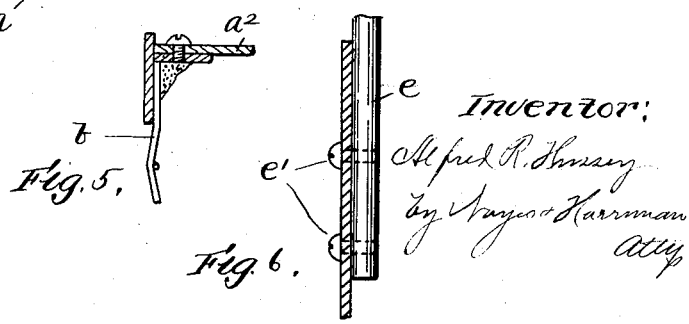
Witnesses:
H. B. Davis.
D. S. Peterson.
Inventor:
Alfred R. Hussey
by Hayes & Harriman
Atty A. R. HUSSEY.
APPARATUS FOR COLLECTING DRINKING CUPS.
APPLICATION FILED MAY 12, 1910.

986,571.

Patented Mar. 14, 1911.
3 SHEETS—SHEET 3.

Witnesses:
H. B. Davis.
D. S. Peterson.

Inventor:
Alfred R. Hussey
by Hayes & Harriman
Attys.

UNITED STATES PATENT OFFICE.

ALFRED R. HUSSEY, OF HARVARD, MASSACHUSETTS, ASSIGNOR TO AMERICAN WATER SUPPLY COMPANY OF NEW ENGLAND, OF BOSTON, MASSACHUSETTS, A CORPORATION OF MASSACHUSETTS.

APPARATUS FOR COLLECTING DRINKING-CUPS.

986,571.  Specification of Letters Patent.  Patented Mar. 14, 1911.

Application filed May 12, 1910.  Serial No. 560,793.

*To all whom it may concern:*

Be it known that I, ALFRED R. HUSSEY, of Harvard, in the county of Worcester and State of Massachusetts, have invented an Improvement in Apparatus for Collecting Drinking-Cups, of which the following is a specification.

Drinking-cups are now made of paper which are so inexpensive as to admit of being used once and then thrown away. Such cups are very desirable from a sanitary point of view, and particularly in public places. In theaters and other places of amusement it is the custom to serve the patrons with drinking water, and, since the innovation of paper cups, it is now possible to serve individual drinking-cups filled with water, which, when once used, may be thrown away.

This invention has for its object the production of a tray having provision for carrying filled cups to be served to the patrons; and also, more particularly, having a waste receptacle for receiving the used cups as they are collected, and to require that they be crumpled or crushed before or while being deposited therein. The waste receptacle has sight openings so that the patrons can see the crumpled cups which are deposited therein. As some of the cups which are collected contain some water, a portion of the waste receptacle is made water tight to hold the waste water, and means may be provided for conducting the water to the water containing portion of the waste receptacle.

The tray may have provision for carrying filled cups, and also a waste receptacle; or, two separate trays may be employed, one having provision for carrying the filled cups and the other having a waste receptacle. The paper cups, when filled, may be contained in removable holders, which are especially constructed to support the flexible side-walls thereof, as shown in my application for Letters Patent Ser. No. 560,792 and the holders are placed in holes in the cup-carrying and collecting apparatus, or the paper cups may be placed directly in said holes, so far as my invention is concerned.

Figure 1:
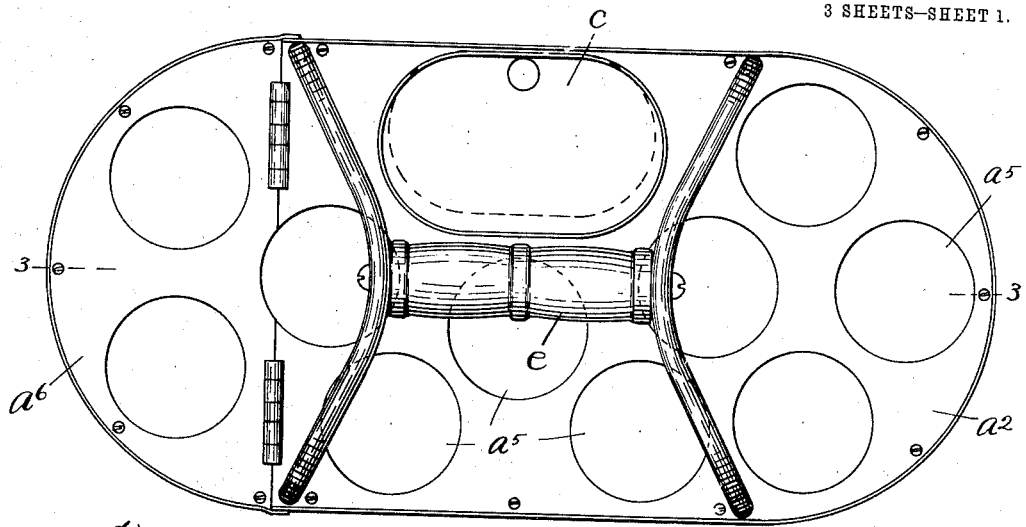
Figure 2:
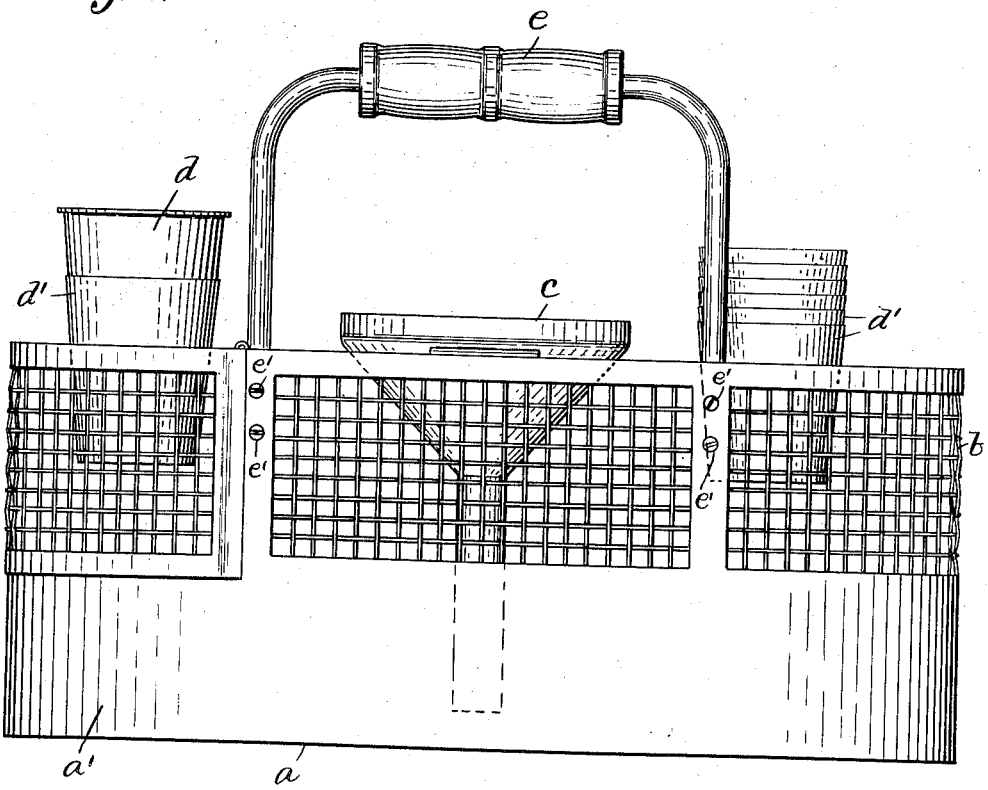
Figure 7:
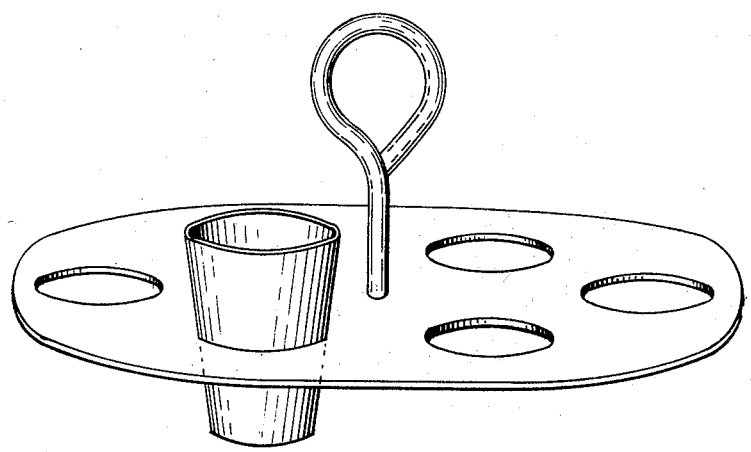
Figure 8:
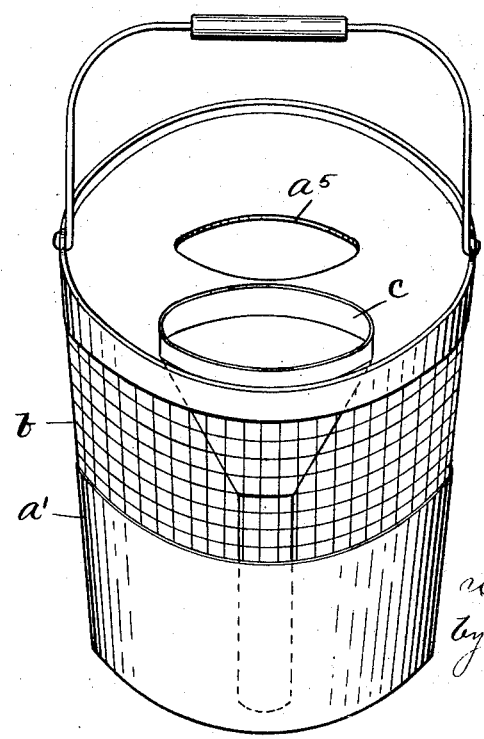

Figure 1 is a plan view of a tray embodying this invention, Fig. 2 is a side elevation of the same. Fig. 3 is a longitudinal vertical section of the same, taken on the dotted line 3—3, Fig. 1, a crumpled cup being shown in the waste receptacle, Fig. 4 is a vertical section of a portion of the tray taken on the dotted line 4—4, Fig. 3, Figs. 5 and 6 are sectional details to be referred to, Fig. 7 is a side elevation of a tray adapted only for serving filled cups, and Fig. 8 is a side elevation of a tray adapted only for receiving the cups after they have been used.

Referring to Figs. 1 to 6, the tray is shown as having a waste receptacle with a bottom $a$, side-walls $a'$, and a top $a^2$. The bottom and lower part of the side-walls are made of sheet metal, and are imperforate so as to form a water-tight compartment, and the upper part $b$, of the side-walls is made of woven wire with large meshes, which form sight openings, so that the interior of the receptacle is exposed to view. The open work or woven sides, instead of being formed of wire, may be formed in any other suitable manner, so long as the interior of the receptacle is exposed to view. The object of making the upper part of the side-walls in this manner is to enable the patrons to see the crumpled cups which are contained in the receptacle; but if this object is not desired, then the side-walls may be constructed in any suitable manner.

The open-work portions of the side-walls may be made by forming large rectangular openings in the sheet-metal side-walls and covering said openings with sections of woven wire in any suitable manner, said woven-wire sections being preferably arranged on the inside and secured by solder, see Fig. 5.

The imperforate portion of the receptacle is deep enough to hold considerable water, to receive the water which is drained from the cups, when collected. At a convenient location in the top-plate, a funnel $c$ may be arranged, which extends down into the receptacle and has a spout which terminates near the bottom thereof. The water remaining in the cups is poured into said funnel, and conducted to the water-tight compartment.

The top-plate $a^2$ has several holes $a^3$, of suitable size to receive the drinking-cups $d$ or holders $d'$, containing said cups.

The tray is provided with a handle $e$ for carrying it, which may be secured to the receptacle by screws $e'$, see Fig. 6.

For serving the filled cups to the patrons they will be placed in the holes in the supporting top-plate $a^2$.

When collecting the used cups, they will be crumpled or forcibly pushed through any one of the holes in the top-plate into the waste receptacle, but those cups which contain water may be drained first by inverting them above the funnel. The holes $a^5$ are made large enough to receive the filled cups, but will not admit of the cups passing through them unless previously crumpled, yet they may be forced through them, being crushed when thus forced. Their destruction is thus insured. Making the holes of such size as to require the cups to be crumpled in order that they may be deposited in the waste receptacle, forms one of the important features of this invention.

As the cups are collected and deposited in the waste receptacle, the holders, if used, may be nested in one of the holes, as shown in Figs. 2 and 3.

For the purpose of removing the crumpled cups from the waste receptacle, the top-plate thereof may have a portion, as $a^6$, made as a lid, which is hinged to the remaining portion, and said lid may be lifted to obtain access to the interior of the receptacle.

Referring to Fig. 7, a tray having a supporting-plate only for the filled cups is shown, provided with a handle by which it may be carried; and, in Fig. 8, a receptacle is shown having a top-plate with a single hole of such size as to require the cups to be crumpled before or while they are being pushed through it into the receptacle, and said receptacle has a funnel in its top-plate which extends down into the water tight compartment, so that the water remaining in the cups may be emptied into said compartment.

I claim:

1. A tray having a waste-receptacle with a top-plate for closing the same having one or more holes through which a paper cup may be forced, said receptacle having sight openings in its side wall below said top-plate, substantially as described.

2. A tray having a waste-receptacle with a top-plate for closing the same having one or more holes through which a paper cup may be forced, said receptacle having a water-tight bottom portion and also having openings in its side wall below said top-plate and above said water-tight bottom portion, substantially as described.

3. A tray having a waste-receptacle with a top-plate for closing the same having a hinged lid and one or more holes through which a paper cup may be forced, said receptacle having a water-tight bottom portion and also having openings in its side wall below said top-plate and above said water-tight bottom portion, substantially as described.

4. A tray having a waste receptacle for water and for crumpled cups, provided with an opening through which the cups are pushed, and a funnel having a spout terminating near the bottom of the receptacle, substantially as described.

In testimony whereof, I have signed my name to this specification, in the presence of two subscribing witnesses.

ALFRED R. HUSSEY.

Witnesses:
GEO. R. BLINN,
AMOS L. TAYLOR.